(12) United States Patent
Mitchell et al.

(10) Patent No.: US 10,878,840 B1
(45) Date of Patent: Dec. 29, 2020

(54) METHOD OF RECOGNISING A SOUND EVENT

(71) Applicant: Audio Analytic Ltd, Cambridgeshire (GB)

(72) Inventors: Christopher James Mitchell, Cambridgeshire (GB); Sacha Krstulovic, Cambridgeshire (GB); Cagdas Bilen, Cambridgeshire (GB); Juan Azcarreta Ortiz, Cambridgeshire (GB); Giacomo Ferroni, Cambridgeshire (GB); Arnoldas Jasonas, Cambridgeshire (GB); Francesco Tuveri, Cambridgeshire (GB)

(73) Assignee: AUDIO ANALYTIC LTD

( * ) Notice: Subject to any disclaimer, the term of this patent is extended or adjusted under 35 U.S.C. 154(b) by 0 days.

(21) Appl. No.: 16/601,992

(22) Filed: Oct. 15, 2019

(51) Int. Cl.
*G10L 25/51* (2013.01)
*G10L 25/93* (2013.01)
*G06N 5/04* (2006.01)
*G06N 20/00* (2019.01)
*G10L 25/27* (2013.01)

(52) U.S. Cl.
CPC ............... *G10L 25/51* (2013.01); *G06N 5/04* (2013.01); *G06N 20/00* (2019.01); *G10L 25/27* (2013.01)

(58) Field of Classification Search
CPC ......... G10L 25/27; G10L 25/30; G10L 25/48; G10L 25/51; G10L 25/78; G10L 25/93; G10L 17/06; G10L 17/26; G06N 3/04; G06N 20/00; H04R 3/00; H04R 29/00
See application file for complete search history.

(56) References Cited

U.S. PATENT DOCUMENTS

| | | | | |
|---|---|---|---|---|
| 5,710,866 A | * | 1/1998 | Alleva | G10L 15/10 704/246 |
| 2014/0358539 A1 | * | 12/2014 | Rao | G10L 15/183 704/243 |
| 2015/0095032 A1 | * | 4/2015 | Li | G10L 15/08 704/255 |
| 2015/0161992 A1 | * | 6/2015 | Jung | G10L 15/083 704/251 |
| 2016/0260426 A1 | * | 9/2016 | Kim | G10L 15/05 |
| 2017/0332168 A1 | * | 11/2017 | Moghimi | G10L 21/0208 |
| 2018/0068653 A1 | * | 3/2018 | Trawick | G10L 15/16 |
| 2018/0293988 A1 | * | 10/2018 | Huang | G10L 17/20 |
| 2018/0324540 A1 | * | 11/2018 | Liu | H04S 5/00 |

* cited by examiner

*Primary Examiner* — Thang V Tran
(74) *Attorney, Agent, or Firm* — Tarolli, Sundheim, Covell & Tummino LLP

(57) ABSTRACT

A method for recognising at least one of a non-verbal sound event and a scene in an audio signal comprising a sequence of frames of audio data, the method comprising: for each frame of the sequence: receiving at least one sound class score, wherein each sound class score is representative of a degree of affiliation of the frame with a sound class of a plurality of sound classes; for a sound class score of the at least one sound class scores: determining a confidence that the sound class score is representative of a degree of affiliation of the frame with the sound class by processing a value for a property associated with the frame, wherein the value is processed using a learned model for the property; adjusting the sound class score for the frame based at least on the determined confidence.

19 Claims, 6 Drawing Sheets

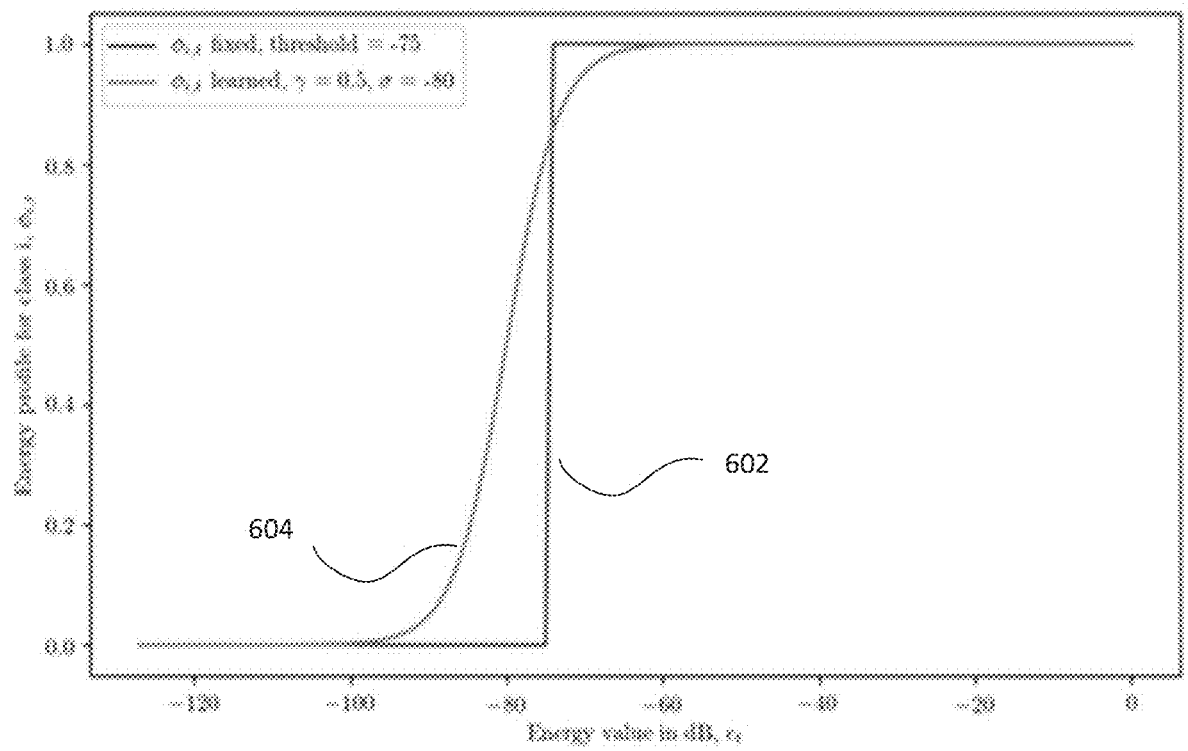
Fig. 6

METHOD OF RECOGNISING A SOUND EVENT

FIELD OF THE INVENTION

This invention generally relates to recognising non-verbal sound events and/or scenes by processing audio data.

BACKGROUND

Background information on sound identification systems and methods can be found in the applicant's PCT application WO2010/070314.

SUMMARY

According to a first aspect of the present invention there is provided a method for recognising at least one of a non-verbal sound event and a scene in an audio signal comprising a sequence of frames of audio data. The method may comprise, for each frame of the sequence, receiving at least one sound class score. Each sound class score may be representative of a degree of affiliation of the frame with a sound class of a plurality of sound classes. The method may comprise, for a sound class score of the at least one sound class scores, determining a confidence that the sound class score is representative of a degree of affiliation of the frame with the sound class by processing a value for a property associated with the frame. The value may be processed using a learned model for the property. The method may comprise adjusting the sound class score for the frame based at least on the determined confidence.

The property may be associated with the frame. The value is a value for the property. More than one sound class score may be adjusted for the frame. Each sound class score may be adjusted for the frame. The method may comprise, for each frame of the sequence, adjusting the sound class score for the frame based at least on the determined confidence A non-verbal sound event and/or scene may be a sound resulting from an event and/or scene and/or action. Examples of a non-verbal sound event may be a baby crying, a gun shooting, a dog barking. A further example of a non-verbal sound event is recognising a presence of a person talking, in other words a method for recognising a non-verbal sound event and/or scene may include a method that comprises determining that a person is speaking (or other details such as when a person has started and stopped speaking, or determining that more than one person is speaking). A method for recognising a non-verbal sound event and/or scene may not comprise recognising and, for example transcribing, exact words of speech, such methods fall within speech recognition.

A non-verbal sound event may be referred to as an audio event. An audio event may be a manifestation of a sound class at a time and/or for a duration. For example, "smoke alarm sounding for 10 seconds" or "baby crying between 12:15 and 12:17 today" are examples of non-verbal sound events.

A sound scene may be referred to as an audio scene; a sound scene may be an environment characterized by a set of expected sounds or sound types. An audio scene may be recognised by recognising and processing a number of audio events. An audio scene may be indicative of a particular context. Examples of audio scenes are a "railway station" (which may be defined by a composite mixture of audio events such as train sounds, crowd sounds etc.) and a "family dinner" (defined by a composite mixture of audio events such as crockery sounds, conversations, chewing sounds etc.).

A sequence of frames of audio sound data may be obtained from an audio signal. An audio signal may be an analogue or digital audio signal captured by a sound capturing device such as a microphone. If the audio signal is an analogue signal then the method may comprise converting the analogue signal into a digital signal using, for example, an Analog to Digital Converter (ADC). The sound capturing device may be a microphone array, if this is the case then multi-channel audio can be captured and may be used to obtain improved sound recognition results.

The audio signal may be defined as a sequence of frames. Each frame may cover approximately 0.032 s of sound sampled every 0.016 s. The sequence denotes that the frames have a chronological order. The frames may be samples taken at regular intervals from a continuous time series (such as the audio signal). As the samples (i.e. frames) may be taken at regular intervals, defined by a sampling rate, time may be equivalently expressed in standard time units (i.e., minutes, seconds, milliseconds etc.) or as a number of frames. For example, in a digital system where the sampling rate is 16 kHz, which means 16,000 samples per second, a duration of 16 milliseconds can be equivalently expressed as 256 samples: 0.016 seconds times 16,000 samples per second equals 256 samples.

The frames of audio data may contain time domain waveform samples or Fourier domain spectrum samples. The frames of audio data may comprise one or more time domain waveform samples or one or more Fourier domain spectrum samples A sound class is a non-verbal sound that can be recognised from an audio signal by the described method. Sound classes can be representative of, indicators of, or associated with, non-verbal sound events and/or scenes, for example a sound class may be "baby crying", "dog barking" or "female speaking". Additionally or alternatively, sound classes can be representative of, indicators of, or associated with, audio scenes, where an audio scene is for example "railway station" or "family dinner". Sound classes can have various levels of precision in their definition, for example "loud crash", "anomaly" or "noisy room" are possible sound classes, which may be considered to be less focused than a sound class of 'baby crying'.

The set of sound classes may comprise one or more target sound classes and one non-target sound class. A target sound class is a sound class that the described system is configured to recognise (for example "baby crying", "dog barking" or "female speaking"). The non-target sound class is a sound class that comprises all sound classes that are not target sound classes. If there are no audio events and/or scenes that have a corresponding target sound class in a frame, then the frame will be classified as having a non-target sound class. The non-target sound class is a sound class that comprises all sound classes that are not target sound classes. If there are no audio event and/or scenes (that have a corresponding target sound class) in a frame then the frame will be classified as having a non-target sound class. The non-target sound class is representative of an absence of each of the one or more target sound classes.

The one or more target sound classes may correspond to one or more events and/or scenes. For example, a target sound class may correspond to, or be associated with, an event such as a 'baby cry' or a 'dog bark'. A target sound class may correspond to, or be associated with, a scene such as 'a railway station' or 'a kitchen'.

A non-target sound class may be representative of an absence of each of the one or more target sound classes. For example, in embodiments there may only be target sound classes of 'gunshot' and 'shouting voice', in this example, if no 'gunshots' or 'shouting voices' are present (for example if there was only a 'dog bark') then the frame may be classified (using the outputted data) as the non-target sound class representative of an absence of each of the one or more target sound classes. In other words, a non-target sound class, representative of an absence of each of the one or more target sound classes, may represent an absence of any event and/or scene or may represent an absence of any of the target sound classes.

For each of the set of sound classes, a score is determined that the frame represents the sound class. The score may identify a degree of affiliation that each frame has to a sound class. The score may be a probability, in which case a summation of the score for each of the set of sound classes equals one. If it is desirable to perform a method that outputs only a single sound class for each frame, then it can be advantageous to have the score as a probability. The score may be referred to as a class affiliation score where the score represents the level of affiliation that a frame has with a sound class. The score may be a distance or any other measurement that represents a level of affiliation that a frame has with a sound class. In other words, the score may not be a probability. Advantageously, if the score is not a probability then it is possible to perform a method that recognises sounds that overlap with respect to time because the method allows for determining more than one sound event and/or scene associated with a frame.

Generally speaking, the method may comprise adjusting the sound class scores for multiple frames of the sequence of frames based on one or more of: knowledge about one or more of the sound classes; and knowledge about a sound environment in which the audio data was captured. The knowledge may be prior knowledge and may be received from an outside source. The knowledge about an environment in which the audio data was captured may be that a house, in which a sound recognising device is situated, is empty. The knowledge about one or more of the sound classes may be for example the relative probabilities of occurrence of the sound classes, for example glass break or smoke alarm sounds occurring less frequently than speech sounds. The knowledge about one or more of the sound classes may be for example the cost of making the wrong decision for certain sound classes, for example misdetecting one dog bark may be given a low cost because it is likely that the dog will bark again, whereas misdetecting a glass break has a high cost because the consequences of misdetecting, e.g., a burglar intrusion might be catastrophic. Such knowledge may be considered to be "external" or a priori knowledge because it is obtained from sources which come in addition to the audio signal. Such knowledge contains information of relevance to the likelihood of the recognised sound event and/or scene. The knowledge may have different sensor modality from sound. The scores may be reweighted according to probabilities learned from application-related data. In other words, the scores output by a DNN (or other machine learning model) may be adjusted based on some form of knowledge other the frame of audio data. The knowledge may be referred to as external information. Therefore, generally speaking prior probabilities of sound event and/or scene occurrence for a given application may be used to reweight one or more scores. For example, for sound recognition in busy homes, the scores for any sound class related to speech events and/or scenes would be weighted up. In contrast, for sound recognition in unoccupied homes, the scores for any sound class related to speech events and/or scenes would be weighted down.

One or more sound class scores may be adjusted for each frame of the sequence.

The method may comprise receiving at least one sound class score. The at least one sound class score may be received as an output of a machine learning model, for example as one or more log its output by a neural network. A summation of the at least one sound class scores may therefore not equal one. In other words, the at least one sound class score may be outputs of a neural network that have not yet been processed by a non-linear operation such as a sigmoid function or a softmax function. Or, the at least one sound class score may be likelihood scores output by a Gaussian mixture model or by a hidden Markov model. The at least one sound class score may not have one or more properties of a probability.

The value may be a single value or may be a distribution of values. For example, the value may be a distribution of a bandwidth, or may be a distribution of an amplitude (a mean amplitude and max amplitude, for example). The value may be associated with a single frame of audio data, for example the value may represent an energy of the frame of audio data.

The value may be associated with, or correspond to, a single frame of audio data, for example the value may represent an amplitude of the frame of audio data. In this example, even though the value is associated with a single frame of audio data, there may have been several frames of audio data processed in order to generate the value representing an amplitude for the frame. For example, the amplitude for the frame of audio data may be generated by averaging an amplitude of several frames in the sequence. The value may therefore be a number. However, the value may not necessarily be a number, rather, the value may be a symbol, such as 'inside' or 'outside', or 'restaurant', 'shop' or 'car'. In embodiments, an array for the values can be indexed by symbols rather than numbers.

A property may be associated with the frame. For example, the property of the frame may relate to the audio data of the frame, for example the energy of the frame of audio data.

The property may relate to external factors that cannot be derived directly from the frame of audio data. Examples of such properties may be a number of occupants in house when the frame of audio data was captured, or a time of day when the frame of audio data was captured.

There may be 'additional information' (for example data suitable for training data, or an updated knowledge about an environment) that becomes available after a machine learning model that is used to generate the sound class scores has been trained. Therefore, if the machine learning model used to recognise a sound event and/or scene was to be improved in light of the additional information, then one possibility is to retrain the entire machine learning model using any previously used training data plus the additional data. However, it takes a large amount of time and/or computing resources to retrain the machine learning model. Embodiments of the present invention advantageously provide for the additional information to be used to improve the accuracy of recognition without re-training the machine learning model. This is done by using a method that updates (i.e. adjusts) the outputs of the machine learning model, where the updating utilises the additional information. Therefore, the additional information can be used to improve the accuracy of recognising a sound event and/or class without having to retrain the entire machine learning model entirely.

This is particularly advantageous if the property is changing across time around a deployed model. For example, the behaviour of the (adjusted) sound class scores can be dynamically adapted to the property changes in the environment. For example, where a device is deployed in the field, it may not be possible to retrain onboard the device. However, embodiments of the present invention provide for flexibility for the system (including the device) to adapt to changing conditions.

In embodiments, it may not be additional information that is used to learn the learned model but rather it may be the original training data that was used to train the machine learning model may be used to learn the learned model.

One situation in which additional information may not have been used to initially train the machine learning model may be because the additional information may not have been available/created at the time that the training data was used to train the machine learning model. For example, even if the training data is a large data set, there may be some variation of a sound that were not recorded as part of the training data. Following the training using the training data, the additional data may be created that corresponds to the variations of a sound that that were not recorded as part of the training data. Therefore, it is desirable and advantageous to be able to use the additional information to improve the method of recognising a sound event and/or scene. Embodiments of the present invention provide a method of improving the method of recognising a sound event and/or scene without having to retrain an entire machine learning model used in the method of recognising a sound event and/or scene.

Advantageously, embodiments of the present invention can be performed using a simple function with a small number of parameters, compared to, for example, a large neural network (e.g. a neural network used to generate the sound class scores). For example, the learned model of embodiments of the present invention may be a simple function with a small number of parameters to learn when compared to a neural network. Advantageously this means that embodiments of the present invention can be performed using a small information set (i.e the additional data). The information set may have been recorded after the training of the machine learning model. The information set has the new or desired information. In other words, because the learned model of embodiments of the present invention may be a simple function with a small number of parameters when compared to a neural network, the learned model may be learned (i.e. trained) to a high level of accuracy by using a smaller amount of data than was used to train the machine learning model. Or in other words, because the trained model may be less complex than a neural network, its training across small amounts of data may be, advantageously, less prone to overfitting. Advantageously, embodiments of the present invention provide for data sets that are smaller than the training data used to train the machine learning model to be utilised to improve a method of recognising a sound and/or scene. Examples of the data sets (i.e. the additional information) may relate to a time of day, home status (occupied/unoccupied), or sound distortions through a particular device used to perform the method of recognising a sound event and/or scene which was unseen before the machine learning model was trained. In embodiments, the information set may not comprise additional information to the training data used to train the machine learning model configured to generate sound class scores. The learned model may be a step function. The learned model may be a bell curve.

Even if the training data (used to train the machine learning model) includes what was previously referred to as the 'additional information', a variability and/or labels of the training data may not be adapted to exploiting the 'additional information'. For example, the 'additional information' may relate to an energy of frames of audio data used to train the machine learning model. It is possible to generate information relating to an energy of frames of audio data to be used as training data. However, such generated information may not have: sufficient energy variability; and/or labels that change according to the energy level, to indicate to the machine learning model that energy is an important decision making variable.

In embodiments, it may be advantageous to make a decision to not use certain data to train the machine learning model. For example, the training data may comprise data having a wide variability of energy which could be used to indicate to the machine learning model that energy is an important decision making variable. Training the machine learning model using such data would likely result in the machine learning model having a structure to recognize specific energy levels, and then use the recognised energy levels to recognise sound events and/or scenes. However, this may be not necessarily result in an improved method for recognising sound events and/or scenes because the gain response for devices configured to perform the method of recognising sound events and/or scenes (or at least configured to capture an audio signal used in recognising sound events and/or scenes) can vary between devices. Therefore, a machine learning model that relies on energy to recognise sound events and/or scenes may be inacuarate when used by a variety of devices having a variety of gain responses. Embodiments of the present invention can overcome this because the learned model can be learned (i.e. trained) using a smaller amount of data than the training data used to train the machine learning model. Therefore, it may be possible to adjust outputs of a machine learning model by using a learned model that has been learned using data for/from a specific device (i.e. a specific model of a device). Therefore, outputs (e.g. sound class scores) can be adjusted, using embodiments of the present invention, specifically for a device. Generally therefore, embodiments of the present invention provide an advantage of adapting a machine learning model to specific conditions of utilization and additionally provide for improved sound recognition across a variety of devices.

A confidence may be determined for a sound class score of the at least one sound class scores. A confidence may be determined for each of the at least one sound class scores. The determined confidence is a confidence that the sound class score is representative of a degree of affiliation of the frame with the sound class. The confidence is not a strict confidence in the statistical sense. Rather, the confidence refers to how accurate the generated sound class score is deemed to be in view of the 'additional information' and/or the learned model. The confidence may, in part, represent an uncertainty in the method of generating the sound class score. In other words, the confidence may be used to compensate for the uncertainty by emphasizing or de-emphasizing the relative importance of the frame's sound class scores across sound classes. The uncertainty may relate specifically to the property used to determine the confidence. The confidence may be seen as a score, or level of certainty, that the sound class score, outputted from the machine learning model, is correct.

The determined confidence may be used in ways that amount to more than erasing 'unconfident' sound class scores. For example, by modifying the relative emphasis of sound class scores, it is possible to completely remodel the decision space (e.g. the sound class scores). For example, if all class affiliations but one are de-emphasized, then that "switches on" the class affiliation which was not de-emphasized. In other words the relative emphasis determined by the confidence may adapt the whole decision space.

The method may comprise processing the value for a property associated with the frame. The value may be processed using a learned model for the property. The learned model may be configured to determine a confidence that the sound class score is representative of a degree of affiliation of the frame with the sound class.

The learned model may be considered as performing a function of mapping a value to a confidence.

The learned model may comprise a look-up table. The look-up table may comprise a confidence for each of a plurality of values for the property. A look-up table may be considered to be a line graph where discrete values each have a corresponding confidence. A look-up table may be particularly advantageous where the property is not a continuous variable. For example, if the property is an environment, then the property may have values corresponding to symbols 'restaurant', 'train station' and 'shop'. This may therefore be best represented by a look-up table, having a confidence for each of the values corresponding to the three symbols.

The learned model may comprise a distribution defined by learned parameters, wherein the distribution defines a confidence for a range of values for the property. The learned model may be a continuous function that provides a confidence for a range of values. The properties of the learned model may be changed by changing the parameters. The parameters may be learned by training the learned model using data, such as the 'additional information' described above. The parameters may be learned by training the learned model using data, such as the training data used to train the machine learning model configured to output sound class scores. The learned model may for example be a step function, a normal distribution, or a sigmoid function.

Learning the learned model may use a machine learning method.

In embodiments, each property has a different learned model. In embodiments, a different learned model may be used in conjunction with a property for different sound class. For example, if an energy of a frame of audio data (i.e. energy of a frame of audio data is the property) is being used to adjust a sound class score for the sound class 'glass break', the learned model may be a step function. However, if an energy of a frame of audio data (i.e. energy of a frame of audio data is the property) is being used to adjust a sound class score for the sound class 'dog bark', the learned model may be a normal distribution. Therefore, in embodiments, a learned function is unique to a specific property used to adjust a specific sound class. In such an embodiment, data (i.e. 'additional data') that is related to the specific property and specific sound class is used. For example, energy information for a frame of audio data captured during a glass breaking may be used to train a learned model used in the above example, where energy of a frame of audio data is used to adjust a sound class score for the sound class 'glass break'.

The learned model may be configured to define a confidence based on more than one property. For example, the learned model may be represented as a surface, rather than (for example) a line graph. Each axis of the surface may correspond to different properties. In embodiments there may be a level of correlation between each of the properties.

The method may further comprise, for the sound class score of the at least one sound class scores, processing an additional value for the property. The additional value may be associated with an additional frame of the sequence. The additional value may be processed using the learned model for the property. For example, to determine the confidence for a frame, a value that represents an energy of the frame may be input into the learned model and a value that represents an energy of an adjacent frame may further be input into the learned model.

The method may comprise generating the value for the property associated with the frame by processing the frame of audio data.

The method may comprise generating the value for the property associated with the frame by processing more than one frame of audio data. For example, a value may represent an amplitude of a frame of audio data, and the value may have been calculated by averaging amplitudes of: the frame; five frames in the sequence prior to the frame; and five frames in the sequence after the frame. The value may have been calculated by averaging amplitudes of the frame and the amplitude of two adjacent frames in the sequence.

Generating the value for the property associated with the frame by processing more than one frame of audio data may comprise processing: the frame of audio data; and an adjacent frame of audio data. The adjacent frame of audio data may be adjacent in the sequence to the frame of audio data.

Generally speaking, the absence of any acoustic feature that would not have been part of the training data (either because acoustic feature(s) was initially omitted or because the acoustic feature(s) was invented (and/or created) after the training) could be compensated for by embodiments of the present invention.

The property may be associated with the audio data for the frame. For example, the property may be associated with the energy of a frame of audio data or a frequency range of the frame of audio data.

The property may be associated with an environment in which the frame of audio data was captured. For example, values of such a property may indicate a type of environment, for example 'a city', 'countryside', 'train station' or 'kitchen'.

The property may be associated with a location at which the frame of audio data was captured. This may be an exact location, for example a geolocation, or this may be a relative location such as 'outside', 'inside', 'indoors', 'outdoors', 'at home', 'in transit', 'at the office'. Such values may be particularly advantageous if the device used to capture the frame of audio data (and/or perform the method of recognising a sound event and/or scene) is a wearable device.

The property may be associated with a feature of a device used to capture the frame of audio data. For example, the property may be related to an operating mode of the device, or an indication that the device has a particular setting. Examples of values relating to an operation mode of the device may be 'home', 'away' and 'night'. These values do not necessarily explicitly inform the system that there are a specific number of occupants in a house but information, such as the number of occupants in a house, may be inferred from these values.

The property may be associated with an audio feature of an environment in which the frame of audio data was captured. For example, the property may be a reverb profile of a room in which the audio data was captured, or a resonant frequency of a room in which the audio data was captured.

As a further example, the property may relate to clipping. For example, a value for such a property may represent a percentage of the frame that is clipped. The property could relate to channel distortions, the values for such a property may correspond to an estimate of the channel distortion.

The property may be an estimate of room effects. Room effects may comprise, for example, reverb and resonance. For example, values may comprise external measurements of reverberation, an influence of a room on audio, a broad indication about a category of room (e.g. 'a church', 'an auditorium', 'a living room', 'a bathroom'.

The value may be computed by processing the frame of audio data and processing further frames of audio data. For example, the value for energy for frame of audio data may be calculated by taking an average of the energy across a number of the (for example, preceding) frames. This may advantageously smooth out the value of energy for the frame. For example, the frames of audio data corresponding to 1 second may be averaged to compute an energy for a frame.

The property may relate to which of a channel and/or microphone was used to capture the frames of audio data.

The method may comprise performing a non-linear operation on each of the adjusted sound class scores. The non-linear operation may be a sigmoid operation. The non-linear operation may be a softmax operation. The non-linear operation may be a step function. The non-linear operation may be a hyperbolic tangent function. The non-linear operation may be a piecewise linear function. The non-linear operation may be a rectified linear function. The non-linear operation may be a polynomial. The non-linear operation may be a radial basis function. The non-linear operation may be a neural network activation function.

The method may comprise training a machine learning model to generate the plurality of sound class scores, wherein the training comprises processing training data. A machine learning model may be a neural network, such as a recurrent neural network or a feed forward neural network. A machine learning model may be a Gaussian mixture model, a hidden Markov model or a support vector machine. A machine learning model may be any machine that is configured to output frame scores. A machine learning model comprises parameters that can be optimised with the objective of minimising a loss function between frame scores and ground truth labels.

The value of the property may comprise additional information to the training data.

Adjusting the sound class score for the frame may comprise reweighting, using the determined confidence, the sound class score and at least one other sound class score to generate multiple reweighted sound class scores. Adjusting the sound class score for the frame may comprise combining the multiple reweighted sound class scores to generate a combined adjusted sound class score. Adjusting the sound class score for the frame may comprise adjusting the sound class score using the combined adjusted sound class score. The combined adjusted sound class score may be used in conjunction with learned parameters to adjust the sound class score.

The machine learning method used to learn the learned model may comprise training the learned model using training data (e.g. 'additional data') captured by one or more devices configured to capture the sequence of frames of audio data. This advantageously means that the learned model takes into account device specific properties. For example, the learned model may take into account specific microphone properties of a device such as if a particular microphone on a device is insensitive to a given bandwidth of frequency. The learned model may take into account device-specific volume response, or a device-specific frequency response. The machine learning method may comprise training the learned model using data collected that is associated with the property.

The method may further comprise processing the adjusted sound class scores for the sequence of frames to determine a degree of affiliation of the frame with the at least one of a non-verbal sound event and a scene. For example, the adjusted sound class scores may not necessarily be used to recognise an event or a scene. Rather, the adjusted sound class scores could be used to generate an indication of a level of likelihood that the frame is affiliated with at least one of a non-verbal sound event and a scene. For example, the adjusted sound class scores could be used to control a visual indicator (for example, different adjusted sound class scores could correspond to red, amber, or green display). A further example is that the adjusted sound class scores could be used to control a system. There therefore may be a distinction between using the adjusted sound class scores to recognise at least one of a non-verbal sound event and a scene and for other purposes.

The method may further comprise processing the adjusted sound class scores for the sequence of frames to recognise the at least one of a non-verbal sound event and a scene.

Recognising the at least one of a non-verbal sound event and a scene may comprise generating a sound class decision.

The adjusted sound class scores may be processed to generate a sound class decision for a frame. This processing can output a single sound class decision for a frame by processing scores for multiple sound classes for a frame. This processing may output multiple sound class decisions for a frame by processing scores for multiple sound classes for a frame. Sound classes scores for multiple frames may be processed in order to generate a sound class decision for a single frame. A sound class decision is an indication that a frame is associated with a sound class. In other words, the sound class decision is an indication that the non-verbal sound event and/or scene that is represented by the sound class decision has occurred during the time spanned by the frame. To generate the sound class decision, long term temporal information is processed, for example, sound class scores for multiple frames may be processed to determine a sound class decision for a frame. The sound class decision may be a hard decision, for example the sound class decision may be a yes or a no that the frame is associated with one (or more) sound class (classes). The sound class decision may be a soft decision that represents a likelihood that a sound class has one or more sound classes associated with it. For this step, multiple sound class scores may be input and a sound class decision may be output, in this example, the sound class decision is the outputted sound class. Sound class decisions are processed to recognise one or more non-verbal sound event and/or scene. Recognising a non-verbal sound event and/or scene may comprise generating an indication of a continuous sound event and/or scene. Such an indication may be output to a further device, or may be communicated to a user via a user interface.

According to another aspect there is provided a non-transitory data carrier carrying processor control code which when running on a device causes the device to perform any of the above method steps.

According to another aspect there is provided a computer system configured to implement any of the above method steps.

According to another aspect there is provided a consumer electronic device comprising the above computer system.

In a related aspect there is provided a non-transitory data carrier carrying processor control code which when running on a device causes the device to operate as described.

In a related aspect there is provided a computer system configured to implement the method as described.

In a related aspect there is provided a consumer electronic device comprising the computer system as described.

According to another aspect there is provided a system for recognising at least one of a non-verbal sound event and a scene in an audio signal. The audio signal may comprise a sequence of frames of audio data. The system may comprise a microphone to capture the audio data and one or more processors. The system may be configured to, for each frame of the sequence, receive at least one sound class score. Each sound class score may be representative of a degree of affiliation of the frame with a sound class of a plurality of sound classes. The system may be configured to, for a sound class score of the at least one sound class scores, determine a confidence that the sound class score is representative of a degree of affiliation of the frame with the sound class by processing a value for a property associated with the frame. The value may be processed using a learned model for the property. The system may be configured to adjust the sound class score for the frame based at least on the determined confidence.

It will be appreciated that the functionality of the devices we describe may be divided across several modules and/or partially or wholly implemented in the cloud. Alternatively, the functionality may be provided in a single module or a processor. The or each processor may be implemented in any known suitable hardware such as a microprocessor, a Digital Signal Processing (DSP) chip, an Application Specific Integrated Circuit (ASIC), Field Programmable Gate Arrays (FPGAs), a GPU (Graphical Processing Unit), a TPU (Tensor Processing Unit), a NPU (Neural Processing Unit), and so forth. The or each processor may include one or more processing cores with each core configured to perform independently. The or each processor may have connectivity to a bus to execute instructions and process information stored in, for example, a memory.

The invention further provides processor control code to implement the above-described systems and methods, for example on a general purpose computer system, a digital signal processor (DSP) or a specially designed math acceleration unit such as a Graphical Processing Unit (GPU), a Tensor Processing Unit (TPU) or a NPU (Neural Processing Unit). The invention also provides a carrier carrying processor control code to, when running, implement any of the above methods, in particular on a non-transitory data carrier—such as a disk, microprocessor, CD- or DVD-ROM, programmed memory such as read-only memory (Firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit), FPGA (Field Programmable Gate Array), GPU (Graphical Processing Unit), TPU (Tensor Processing Unit) or NPU (Neural Processing Unit), or code for a hardware description language such as Verilog™ or VHDL (Very high speed integrated circuit Hardware Description Language). As the skilled person will appreciate such code and/or data may be distributed between a plurality of coupled components in communication with one another. The invention may comprise a controller which includes a microprocessor, working memory and program memory coupled to one or more of the components of the system. The invention may comprise performing a DNN operation on a GPU and/or an AI accelerator microprocessor, and performing other operations on a further processor.

These and other aspects will be apparent from the embodiments described in the following. The scope of the present disclosure is not intended to be limited by this summary nor to implementations that necessarily solve any or all of the disadvantages noted.

BRIEF DESCRIPTION OF DRAWINGS

Embodiments of the invention will be described, by way of example, with reference to the accompanying drawings, in which:

FIG. 6 shows graphical examples of learned models.

DETAILED DESCRIPTION OF THE DRAWINGS

Figure 1:
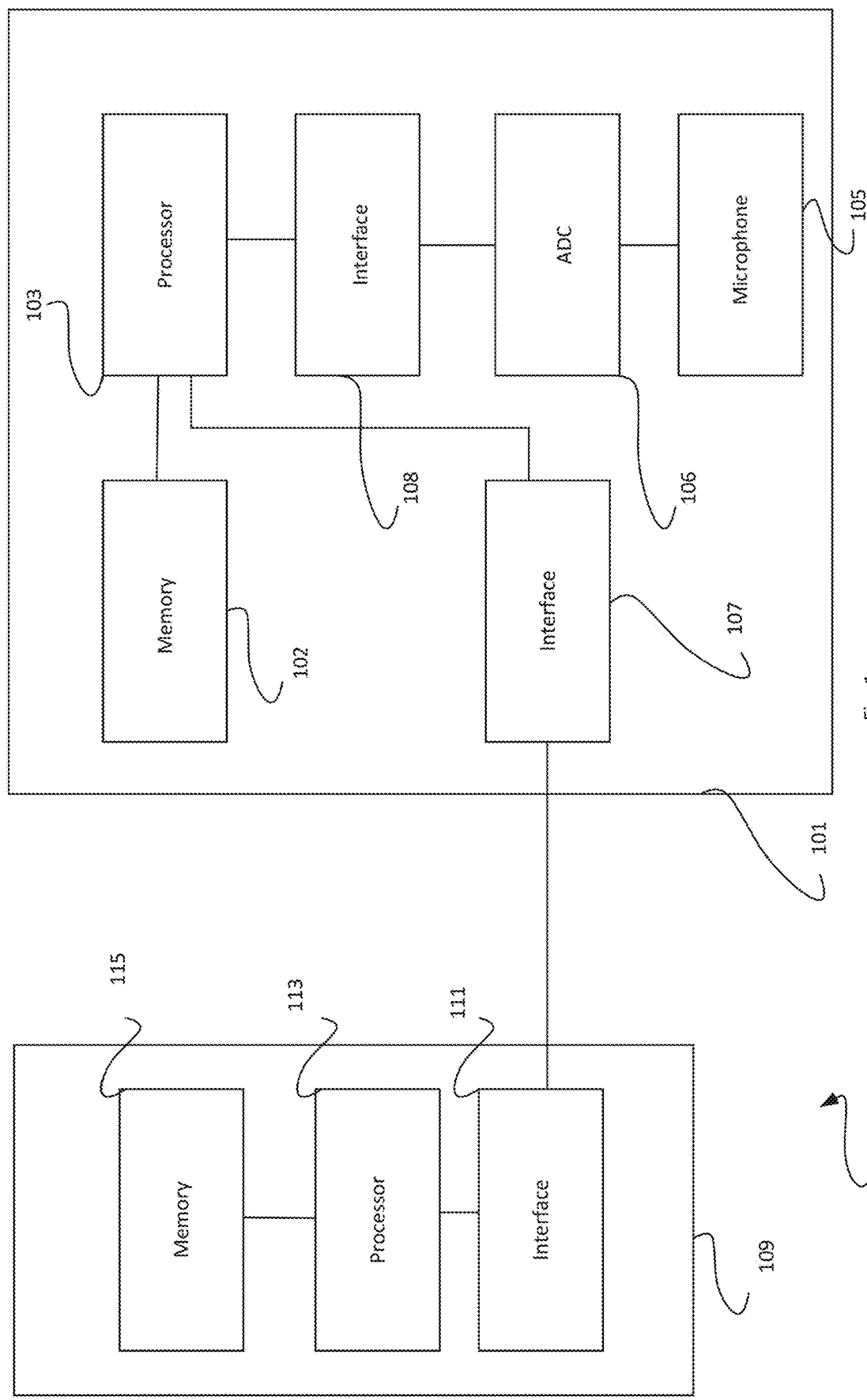
FIG. 1 shows a block diagram of a system 100 configured to recognise a non-verbal sound event and/or scene.

FIG. 1 shows a system 100 configured to recognise a non-verbal sound event and/or scene.

The system comprises a device 101. The device 101 may be any type of electronic device. The device 101 may be a consumer electronic device. For example the consumer electronic device 101 may be, a smartphone, a headphone, a smart speaker, a car, a digital personal assistant, a personal computer, a tablet computer. The device 101 comprises a memory 102, a processor 103, a microphone 105, an analogue to digital converter (ADC) 106, an interface 108 and an interface 107. The processor is in connection to: the memory 102; the microphone 105; the analogue to digital converter (ADC) 106; interface 108; and the interface 107. The processor 103 is configured to recognise a non-verbal sound event and/or scene by running computer code stored on the memory 102. For example, the processor 103 is configured to perform the method 200 of FIG. 2. For example, the processor 103 is configured to perform the method 500 of FIG. 5. The processor 103 may comprise one or more of a CPU module and a DSP module. The memory 102 is configured to store computer code that when executed by the processor 103, causes the processor to recognise a non-verbal sound event and/or scene.

The microphone 105 is configured to convert a sound into an audio signal. The audio signal may be an analogue signal, in which case the microphone 106 is coupled to the ADC 106 via the interface 108. The ADC 106 is configured to convert the analogue audio signal into a digital signal. The digital audio signal can then be processed by the processor 103. In embodiments, a microphone array (not shown) may be used in place of the microphone 105.

Although the ADC 106 and the microphone 105 are shown as part of the device 101, one or more of the ADC 106 and the microphone 105 may be located remotely to the device 101. If one or more of the ADC 106 and the microphone 105 are located remotely to the device 101, the processor 103 is configured to communicate with the ADC 106 and/or the microphone 105 via the interface 108 and optionally further via the interface 107.

The processor 103 may further be configured to communicate with a remote computing system 109. The remote computing system 109 is configured to recognise a non-verbal sound event and/or scene, therefore the processing steps required to recognise a non-verbal sound event and/or scene may be spread between the processor 103 and the processor 113. The remote computing system comprises a processor 113, an interface 111 and a memory 115. The interface 107 of the device 101 is configured to interact with the interface 111 of the device 109 so that the processing steps required to recognise a non-verbal sound event and/or scene may be spread between the processor 103 and the processor 113.

Figure 2:
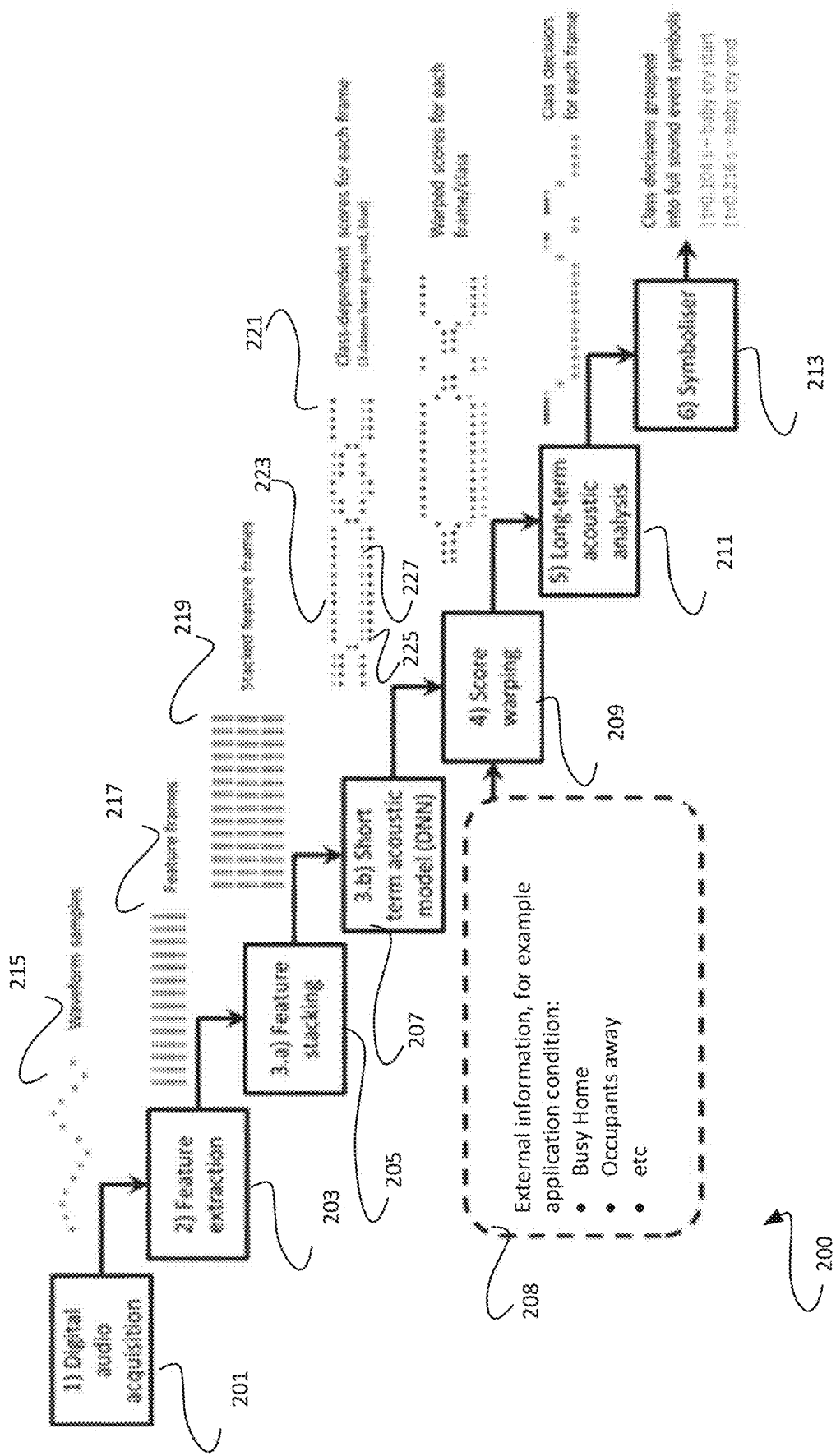
FIG. 2 shows a schematic flow diagram of a method 200 for recognising a non-verbal sound event and/or scene.

FIG. 2 shows a method 200 for recognising a non-verbal sound event and/or scene. The method 200 can be performed by the processor 103 in FIG. 1, or can be split between several processors, for example processors 103 and 113 in FIG. 1.

A step 201 shows acquiring a digital audio sample 215. The audio sample may have been acquired by a microphone, for example microphone 105 of FIG. 1. The audio sample 215 is then converted from an analogue sample to a digital sample by an analogue to digital converter, for example by the analogue to digital converter (ADC) 106 in FIG. 1. The processor 103 is configured to receive the digital sample from the ADC 106 via an interface 108. The microphone 105 and analogue-to-digital (ADC) converter 106 may together perform step 201 to deliver digital audio samples to the processor 103 via the interface 108, for example a serial interface such as 120. The sampling frequency may be 16 kHz, this means that 16,000 audio samples are taken per second.

The digital audio sample 215 is grouped into a series of 32 ms long frames with 16 ms long hop size. If the sampling frequency is 16 Khz, then this is equivalent to the digital audio sample 215 being grouped into a series of frames that comprise 512 audio samples with a 256 audio samples-long hop size.

Once the digital audio sample 215 has been acquired, feature extraction is performed on the frames of the digital audio sample 215, as shown in the step 203. The feature extraction 203 results in a sequence of feature frames 217. The feature extraction step 203 comprises transforming the digital audio sample 215 into a series of multidimensional feature vectors (i.e. frames), for example emitted every 16 ms. The feature extraction of step 203 may be implemented in a variety of ways.

One implementation of feature extraction step 203 is to perform one or more signal processing algorithms on the frames of the digital audio sample 215. An example of a signal processing algorithm is an algorithm that processes a power spectrum of the frame to extract a spectral flatness value for the frame. A further example is a signal processing algorithm that extracts harmonics and their relative amplitudes from the frame.

An additional or alternative implementation of the feature extraction step 203 is to use a Deep Neural Network (DNN) to extract a number of acoustic features for a frame. A DNN can be configured to extract audio feature vectors of any dimension. A bottleneck DNN embedding or any other appropriate DNN embedding may be used to extract acoustic features. Here a neural network bottleneck may refer to a neural network which has a bottleneck layer between an input layer and an output layer of the neural network, where a number of units in a bottleneck layer is less than that of the input layer and less than that of the output layer, so that the bottleneck layer is forced to construct a generalised representation of the acoustic input.

The feature vector stacking step 205 is an optional step of the method 200. The feature vector stacking step 205 comprises concatenating the acoustic feature vectors 217 into larger acoustic feature vectors 219. The concatenation comprises grouping adjacent feature vectors into one longer (i.e. a higher dimensional) feature vector.

For example, if an acoustic feature vector comprises 32 features, the feature vector stacking step 205 may produce a 352 dimension stacked feature vector by concatenating an acoustic feature vector with 5 acoustic feature vectors before and after the considered acoustic feature vector (352 dimensions=32 dimensions×11 frames, where 11 frames=5 preceding acoustic feature vector+1 central acoustic feature vector+5 following acoustic feature vectors).

An alternative example of the feature vector stacking step 205 would be to stack 15 acoustic feature vectors before and after a central acoustic feature vector, where an original acoustic feature vector having 43 features would produce a stacked acoustic feature vector with 1333 dimensions (1333 d=43 d×31 acoustic feature vectors, where 31 acoustic feature vectors=15 before +1 central+15 after).

The acoustic modelling step 207 comprises classifying the acoustic features to classify the frame by determining, for each of a set of sound classes, a score that the frame represents the sound class. The acoustic modelling step 207 comprises using a deep neural network (DNN) trained to classify each incoming stacked or non-stacked acoustic feature vector into a sound class (e.g. glass break, dog bark, baby cry etc.). Therefore, the input of the DNN is an acoustic feature vector and the output is a score for each sound class. The scores for each sound class for a frame may collectively be referred to as a frame score vector. For example, the DNN used in the step 207 is configured to output a score for each sound class modelled by the system every 16 ms.

An example DNN used in step 207 is a feed-forward fully connected DNN having 992 inputs (a concatenated feature vector comprising 15 acoustic vectors before and 15 acoustic vectors after a central acoustic vector=31 frames×32 dimensions in total). The example DNN has 3 hidden layers with 128 units per layer and RELU activations.

Alternatively, a convolutional neural network (CNN), a recurrent neural network (RNN) and/or some other form of deep neural network architecture or combination thereof could be used.

A schematic example of an output of the DNN is shown at 221. In this example, there are three different sound classes represented by three colours: grey (227), red (223) and blue (225). The horizontal axis represents time and the vertical axis represents a value of a score (where a downward vertical direction represents a high score). Each dot is a score value corresponding to a frame of audio data.

A score warping step 209, which may be a score warping step, follows step 207 (i.e. the reweighting/score warping within step 209 remains optional). In step 209, the scores may be reweighted according to probabilities learned from application-related data. In other words, the scores output by the DNN in step 207 are adjusted based on some form of knowledge other than the audio data acquired in step 201. The knowledge may be referred to as external information, examples of such external information can be seen at 208.

As examples, the score warping 209 may comprise the following method: using prior probabilities of sound event and/or scene occurrence for a given application to reweight one or more scores. For example, for sound recognition in busy homes, the scores for any sound class related to speech events and/or scenes would be weighted up. In contrast, for sound recognition in unoccupied homes, the scores for any sound class related to speech events and/or scenes would be weighted down.

The step 209 is a step used to adapt the outputs to new available information. In an embodiment, this is performed by "score warping" comprising learning parameters $\alpha, \{\beta_i\}$ to modify the outputs of the step 207 (i.e. sound class scores, which may be log its). For example, the following equations may be used:

$$\hat{z}_0 = \alpha z_0$$

$$\hat{z}_i = \alpha z_i + \beta_i, \forall i \in [1, \ldots, Nc]$$

wherein $z_i$ represents a sound class score for sound class i as output by the machine learning model, $\hat{z}_i$ represents the adjusted sound class score for sound class i, where $\alpha$ and $\beta_i$ are parameters that are learned using the 'additional information', Nc represents the number of sound classes. The class 0 represents a non-target sound class representative of an absence of each of the one or more sound classes, and may be referred to as the world class. This adjusting pushes the system to learn its confidence on a new dataset (i.e the additional information), and adapt its outputs based on its performance on the application data. Hence the new information here is the distribution and variability of the property value across the new data. Parameters $\alpha$ and $\beta_i$ may be learned, for example, by minimizing a loss function, wherein the loss function may be, for example, cross-entropy across the new data. Other learning algorithms to learn $\alpha$ and $\beta_i$ may include the EM algorithm, Baum-Welch algorithm, the minimization of a custom loss function other than cross-entropy, the minimization of a connectionist Temporal classification (CTC) loss.

Long-term acoustic analysis is performed at step 211. The long-term acoustic analysis performed at step 211 comprises processing the sound class scores for multiple frames of the sequence of frames to generate, for each frame, a sound class decision for each frame. The long-term acoustic analysis performed at step 211 outputs frame-level classification decisions after integrating longer term temporal information, typically spanning one or several seconds, into the frame-level scoring.

As an example, if there are four sound classes: A, B, C and D, the long-term acoustic analysis performed at step 211 will comprise receiving a sequence of vectors. Each vector would have four dimensions, where each dimension represents a (optionally reweighted) score for a class. The long-term acoustic analysis performed at step 211 comprises processing the multiple vectors that represent a long-term window, typically 1.6 second/100 score values long context window. The long-term acoustic analysis performed at step 211 will then output a series of classification decisions for each frame (i.e. the output will be A, B, C or D for each frame, rather than 4 scores for each frame). The long-term acoustic analysis performed at step 211 therefore uses information derived from frames across a long-term window.

The long-term acoustic analysis can be used in conjunction with external duration or co-occurrence models. For example:

a. Transition matrices can be used to impart long-term information and can be trained independently of Viterbi. Transition matrices are an example of a co-occurrence model and also implicitly a duration model. Co-occurrence models comprise information representing a relation or an order of events and/or scenes.

b. An explicit model of duration probabilities can be trained from ground truth labels (i.e. known data), for example fitting a Gaussian probability density function on the durations of one or several baby cries as labelled by human listeners. In this example, a baby cry may last between 0.1 s and 2.5 s and be 1.3 s long on average. More generally, the statistics of duration can be learned from external data. For example, from label durations or from a specific study on a duration of a specific sound event and/or scene.

c. Many types of model can be used as long as they are able to generate some sort of class-dependent duration or co-occurrence score/weight (e.g., graphs, decision trees etc.) which can, for example, be used to rescore a Viterbi path(s), or alternatively, be combined with the sound class scores by some method other than the Viterbi algorithm across the long term, for example across a sequence of score frames spanning 1.6 s.

Examples of the long-term acoustic analysis performed at step 211 are given below, where the long-term acoustic analysis may thus apply a temporal structure constraint.

Score smoothing and thresholding
Viterbi optimal path search
a recurrent DNN trained to integrate the frame decisions across a long-term window.

In more detail:

i. Score smoothing and thresholding across long term window

Median filtering or some other form of long-term low-pass filtering (for example a moving average filter) may be applied to the score values spanned by the long-term window. The smoothed scores may then be thresholded to turn the scores into class decisions, e.g., when a baby cry score is above the threshold then the decision for that frame is baby cry, otherwise the decision is world ("not a baby"). There is one threshold per class/per score.

b) Viterbi optimal path search across a long term window

The input of the using the Viterbi algorithm to perform step 211 comprises:

1. A state-space definition: there are S states where each state (s_i) is a sound class, for example: s_0=world; s_1=baby_cry; s_2=glass_break; etc. In one configuration there are 6 states however, in general there are as many states as there are classes to be recognised plus an extra state representing all other sounds (labelled as a 'world' class, (i.e. a non-target sound class), in the above).

2. An array of initial probabilities: this is a S-sized array, where the i-th element is the probability that the decoded sequence starts with state i. In an example, these probabilities are all equal (for example, all equal to 1/S).

3. A transition matrix A: this is a S×S matrix where the element (i, j) is the probability of moving from state i to state j. In an example configuration, this matrix is used to block transitions between target classes, for example, the probabilities of the row 0 (world class) are all greater than zero, which means a state can move from world to all other target classes. But, in row 1 (baby cry) only columns 0 and 1 are non-zero, which means that from baby cry the state can either stay in the baby cry state or move to the world state. Corresponding rules apply for the other rows.

4. An emission matrix: this is a N×S matrix where the element (i, j) is the score (given by the acoustic model, after warping) of observing class j at the time frame i. In an example, N is equal to 100. In this example, the time window is 100 frames long (i.e. 1.6 seconds) and it moves with steps of 100 frames, so there is no overlap.

In other words, every time that the Viterbi algorithm is called, the Viterbi algorithm receives as an input, for example, 100 sound class scores and outputs 100 sound class decisions.

The settings are flexible, i.e., the number of frames could be set to a longer horizon and/or the frames could overlap.

Transition matrices can be used to forbid the transition between certain classes, for example, a dog bark decision can be forbidden to appear amongst a majority of baby cry decisions.

c) DNN across a long-term window a. Examples of a DNN used to perform the long-term acoustic analysis performed at step 211 are:

A long short-term memory recurrent neural network (LSTM-RNN) with 101 stacked frame score vectors (50 frames before and after a target frame), where score frame vectors contain 6 scores (one for each of 6 classes) as input. Thus, the input size is a 101 by 6 tensor. The rest of the DNN comprises 1 LSTM hidden layer with 50 units, hard sigmoid recurrent activation, and tan h activation. The output layer has 6 units for a 6-class system.

A gated recurrent units RNN (GRU-RNN): the input size is similarly a 101 by 6 tensor, after which there are 2 GRU hidden layers with 50 units each, and tan h activation. Before the output layer a temporal max pooling with a pool size of 2 if performed. The output layer has 6 units for a 6-class system.

Long-term information can be inflected by external duration or co-occurrence models, for example transition matrices in case c) of using a Viterbi optimal path search, or inflected by an external model made by learning the typical event and/or scene lengths, for example probabilities of event and/or scene duration captured by some machine learning method, typically DNNs.

At the step 213, the sound class decisions for a sequence of frames are processed to recognise a non-verbal sound event and/or scene. In an example, the sound class decisions for multiple frames are input and an indication of one or more non-verbal sound events and/or scenes are output. Examples of how step 213 may be performed are explained below, one or more of the below examples may be implemented in the step 213:

i. the sound class decisions for each frame may be grouped into long-term event and/or scene symbols with a start time, an end time and a duration;

ii. discarding a sequence of sound class decisions of the same class which are shorter than a sound event and/or scene duration threshold defined individually for each sound class. For example: a sequence of "baby cry" sound class decisions can be discarded if the sequence of "baby cry" sound class decisions are collectively shorter than 116 milliseconds (which is approximately equivalent to 10 frames); a sequence of "smoke alarm" sound class decisions can be discarded if the sequence of "smoke alarm" sound class decisions are collectively shorter than 0.4 seconds (which is approximately equivalent to 25 frames). The sound event and/or scene duration thresholds can be set manually for each class;

iii. merging multiple non-verbal sound events and/or scenes of the same sound class that intersect a particular time window into one single non-verbal sound event and/or scene. For example, if two "baby cry" non-verbal sound events and/or scenes are determined to happen within a 4 seconds interval then they are merged into one a single "baby cry" non-verbal sound events and/or scenes, where the window duration (4 seconds in the above example) is a parameter which can be manually tuned. The window duration can be different for each sound class.

Figure 3:
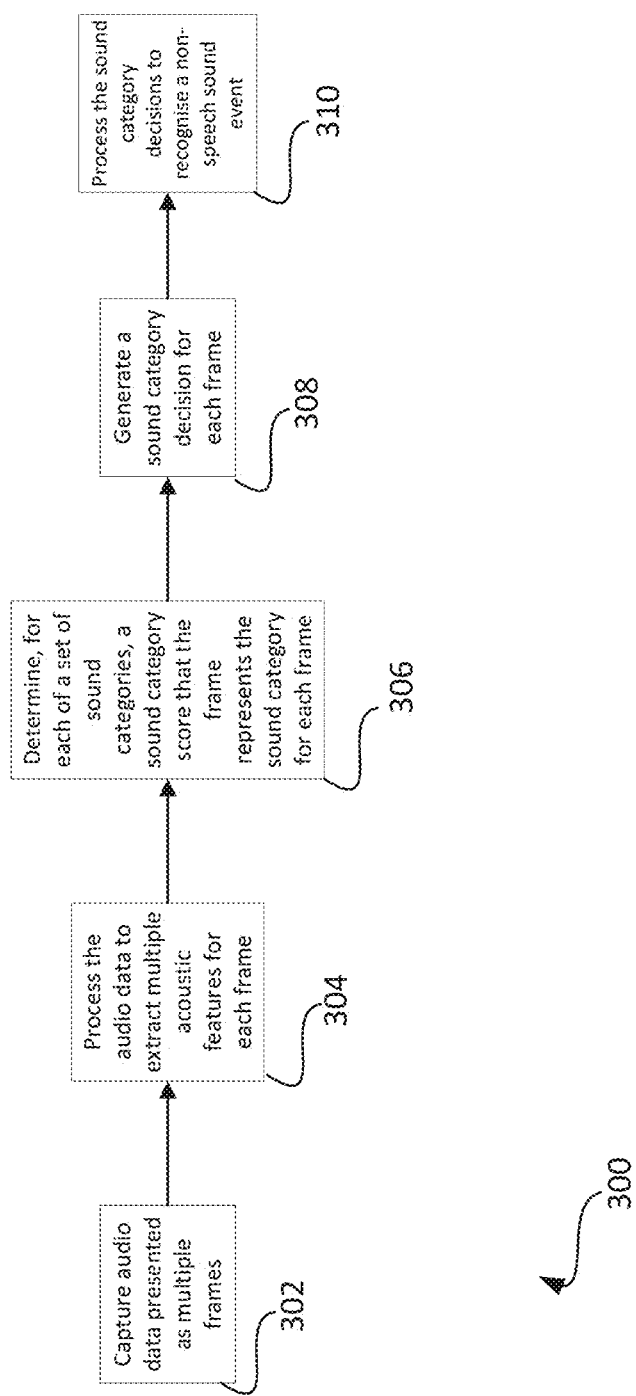
FIG. 3 shows a process 300 for recognising a non-verbal sound event and/or scene using the system of FIG. 2.

FIG. 3 shows a process 300 for recognising a non-verbal sound event and/or scene using the system of FIG. 2.

The first step (302) of the process 300 is to capture audio data comprising multiple frames. The audio data may be captured by the microphone 105 and processed using the ADC 106. The processed audio data is output from the ADC 106 to the processor 103 via the interface 108. The processed audio data may be considered as audio data.

At step 304 the audio data is processed to extract multiple acoustic features for each frame.

At step 306, for each of a set of sound classes, a sound class score that the frame represents the sound class for each frame is determined. Step 306 may comprise classifying the acoustic features to classify the frame by determining, for each of a set of sound classes, a score that the frame represents the sound class.

The next step (308) of the process 300 is to generate a sound class decision for each frame. This is performed by processing the sound class scores for multiple frames of the sequence of frames to generate, for each frame, a sound class decision for each frame.

The next step of the process 300 is to process (step 310) the sound class decisions to recognise a non-speech sound event and/or scene.

In response to recognising a non-speech sound event and/or scene, the system may optionally output a communication to a user device or a further computing device. The system may provide a visual, acoustic, or other indicator in response to recognising a non-speech sound event and/or scene.

Figure 4:
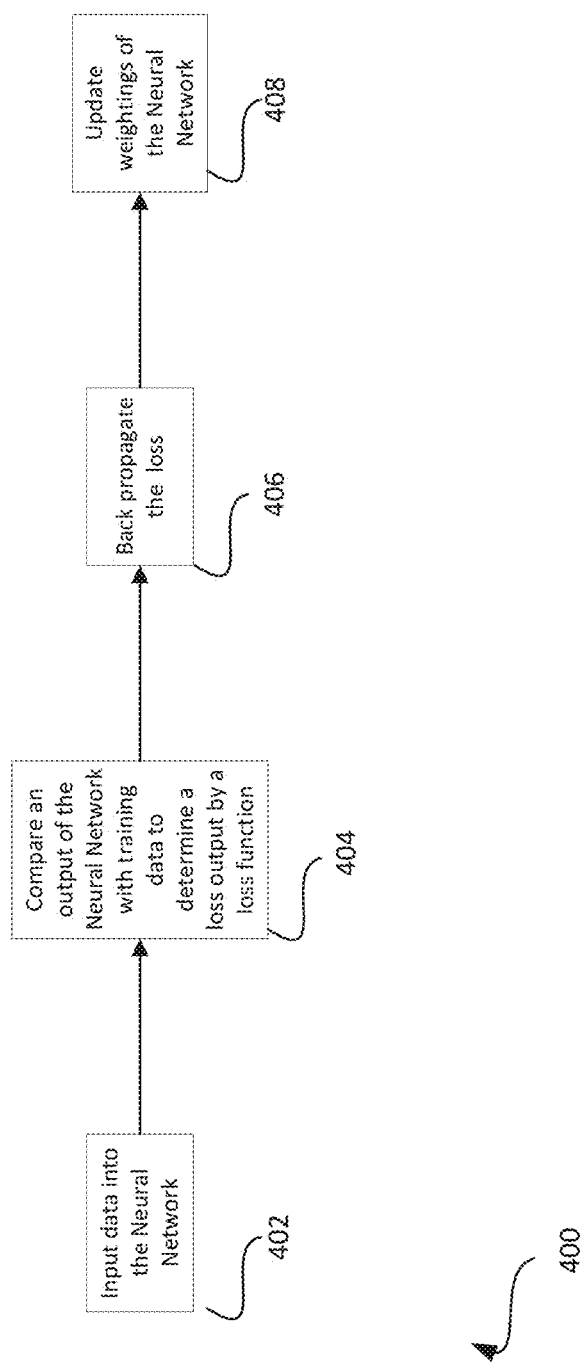
FIG. 4 shows a process 400 for training the machine learning models (e.g. neural network(s)) of the system of FIG. 2.

FIG. 4 shows a process 400 for training the machine learning model(s), for example a neural network, of the system of FIG. 2. FIG. 4 will be discussed in relation to a neural network but other machine learning models may be used.

At step 402, data is input into the Neural Network. In an example, the Neural Network is configured to receive acoustic feature data of multiple frames and output sound class scores for a frame.

At step 404, the output of the Neural Network is compared with training data to determine a loss as determined using a loss function. For example, the outputted sound class scores for a frame are compared to ground truth (sound class labels) for a frame. A loss is calculated for one or more sound classes, preferably a loss is calculated for each of the sound classes.

At step 406, the loss is back propagated. Following the back propagation, the weightings of the Neural Network are updated at step 408.

In an example, a loss function comprising the following features is used to determine a loss. The loss function directly optimises the classification of multi-frame events and/or scenes without resorting to an additional optimisation stage rather than considering only the classification of each short-time audio frame individually.

An example loss function for training the machine learning model(s) of the system of FIG. 2 may be the categorical cross-entropy:

a. $\Sigma_i y_i \log x_i$ wherein i represents a frame, $y_i$ is a sound class label for frame i, and $x_i$ represents one or more sound class scores for frame i output by the recurrent neural network. $y_i$ may be ground truth and may be a vector comprising labels for each sound class. In this example, the machine learning models may be one or more neural network.

Another example loss function for training the machine learning model(s) of the system of FIG. 2 may have a number of properties:

i. A loss value for incorrectly recognising a frame as having a target sound class when the ground truth label of the frame is a non-target sound class.

ii. The loss value for a sound class goes toward zero as more frames having that sound class label are correctly recognised.

iii. The loss value for temporally consistent detections on the sound class are less than the temporally inconsistent detections. In other words, chaotic activations are penalized.

iv. For target classes, any false activation of the other target classes must also be penalized (missed detections are preferable to cross triggers).

In this example, the machine learning models may be one or more neural network.

Each of these criteria can be enforced with one or more specific penalty terms, each of which are explained in more detail below.

Non-Target Cross Entropy

The set of sound classes may comprise one or more target sound classes and one non-target sound class. A target sound class is a sound class that the described system is configured to recognise (for example "baby crying", "dog barking" or "female speaking"). The non-target sound class is a sound class that comprises all sound classes that are not target sound classes. If there are no audio event and/or scenes (that have a corresponding target sound class) in a frame then the frame will be classified as having a non-target sound class. The non-target sound class representative of an absence of each of the one or more target sound classes.

The non-target cross entropy term penalises incorrect and can be determined by:

a. $\Sigma_{i = non\text{-}target\ sound\ class} y_i \log x_i$ wherein i represents a frame having a ground truth of the non-target sound class representative of an absence of each of the one or more target sound classes, $y_i$ is a sound class label for frame i, and $x_i$ represents one or more sound class scores for frame i output by the recurrent neural network. $y_i$ may be ground truth and may be a vector comprising labels for each sound class.

Target Loss

For a class, in order to successfully recognise the sound event and/or scene associated with the class, it may not be necessary to correctly classify every frame. Rather, it may be sufficient to correctly classify only a percentage of frames associated with the sound event and/or scene. For example, for a sound event and/or scene that typically has a short time duration, it may be advantageous to correctly classify the majority of the frames having the class associated with the sound event and/or scene. For a sound event and/or scene that typically has a long time duration, correctly classifying only a small percentage of the frames having the class could be sufficient. For this purpose, a weighted pooling of the scores within a class can be used. Thus, a term of the loss function may determine:

a. $\Sigma_j [(\Sigma_{i\ \in\ label_j} y_i) \log (pool_\beta (x_i, \forall i \in label_j))]$ wherein, j represents a target sound class, $i \in label_j$ represents a frame that has been classified as sound class j, $y_j$ is a sound class label for frame i (i.e. the ground truth), $x_i$ represents one or more sound class scores for frame i output by the recurrent neural network, and $pool_\beta (x_i, \forall i \in label_j)$ is a function of sound class scores and comprises a parameter $\beta$.

The $pool\beta(\ )$ is the pooling function combining a number of outputs, may be defined as:

$$pool_\beta(x_i, \forall i \in label_j) = \frac{\sum_i x_i e^{\beta x_i}}{\sum_i e^{\beta x_i}}$$

which is equivalent to average pooling for $\beta=0$ and max-pooling when $\beta \to \inf$.

With a correct $\beta$ parameter, this loss function will lead to high values when no frames create a detection, and much lower values when sufficient number of frames have a detection, leaving the other frames unconstrained.

Smoothness Loss

As discussed above, temporally continuous classifications (i.e. smooth) are preferable to temporally inconsistent classifications as they are more likely to be considered as a recognition. Thus, a loss term that penalizes non-smooth changes in the class on the label can be used as determined below:

a. $\Sigma_{i=target\ sound\ class} y_i \log(1-(x_i-(x_{i-1}+x_{i+1})/2)^2)$ wherein i represents a frame, $y_i$ represents a sound class label for frame i, $x_i$ represents one or more sound class scores for frame i output by the recurrent neural network, $x_{i-1}$ represents one or more sound class scores for frame i−1 output by the recurrent neural network, wherein the frame i−1 is a frame that has a position in the sequence preceding the frame i; and $x_{i+1}$ represents one or more sound class scores for frame i+1 output by the recurrent neural network, wherein frame i+1 is a frame that has a position in the sequence after the frame i.

Cross-Trigger Loss

In an example, there is a loss term that penalises a frame being classified as more than one class. The loss term increases as other further classes are triggered on the target label (except the world class, since missed detections are not as important). An example term performing such a function is:

$-\Sigma_i [\Sigma_{i \in label_j} y_i \log(1-pool_{max}(x_{i,k}, \forall k \neq j))]$ wherein j represents a target sound class, $i \in label\ j$ represents a frame i having a ground truth of a target sound class j, $y_i$ represents a sound class label for frame i, $x_i$ represents one or more sound class scores for frame i output by the recurrent neural network, $pool_{max}(x_{i,k}, \forall k \neq c)$ represents a highest sound class score of $x_i$ that is not a sound class score for class c.

Figure 5:
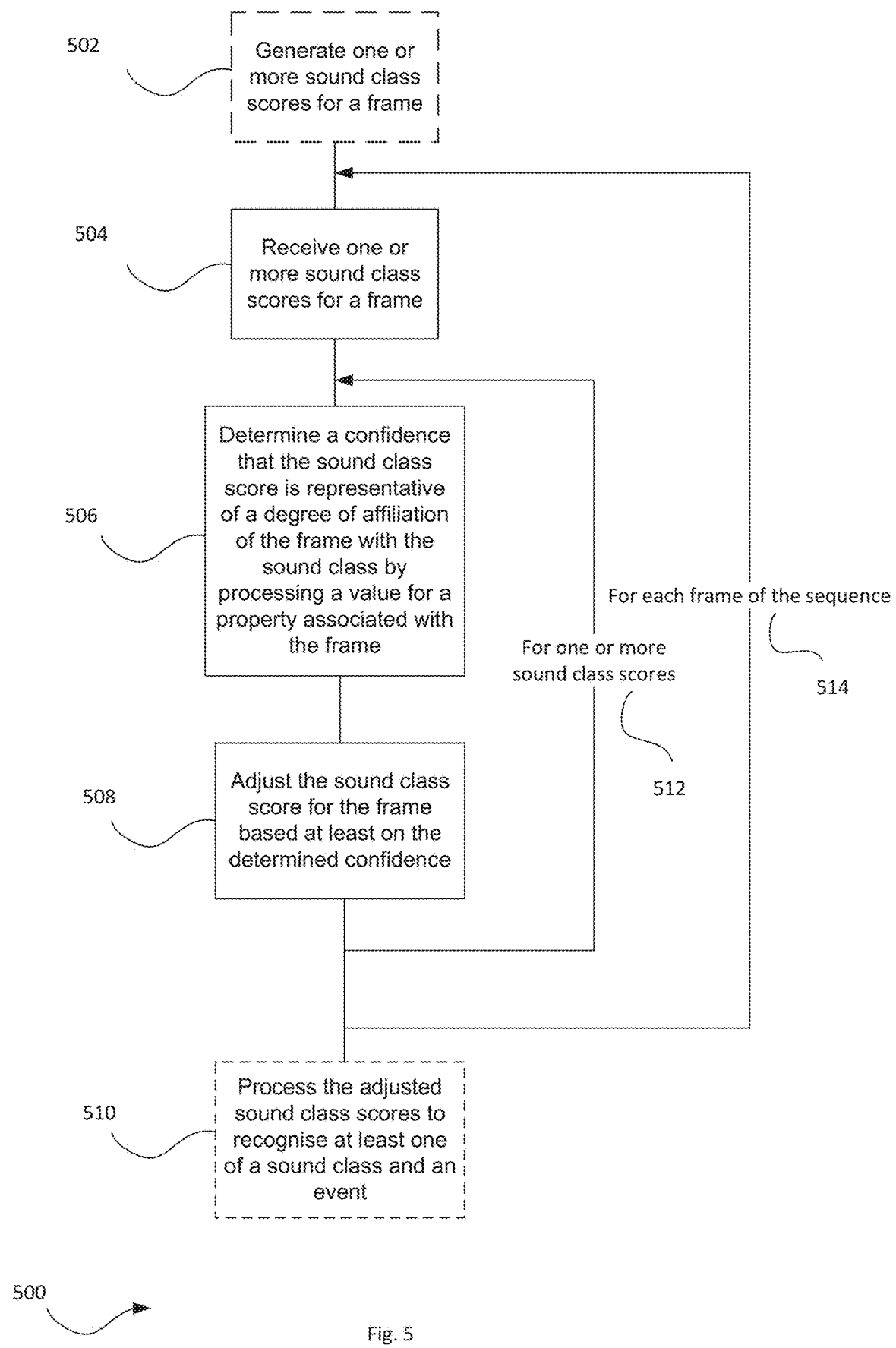
FIG. 5 shows a method 500 for recognising at least one of a non-verbal sound event and a scene in an audio signal comprising a sequence of frames of audio data.

FIG. 5 shows a method 500 for recognising at least one of a non-verbal sound event and a scene in an audio signal comprising a sequence of frames of audio data. The method of FIG. 5 may be performed by the device 101 of FIG. 1, and in particular by the processor 103 FIG. 1.

The method shows a step of receiving at least one sound class score, wherein each sound class score is representative of a degree of affiliation of the frame with a sound class of a plurality of sound classes. The one or more received sound class scores are generated at step 502. The one or more sound class scores may have been generated by the machine learning model (e.g. Neural Network) as described in step 207 of FIG. 2. The method 500 may therefore generally correspond to the step 209 in FIG. 2.

At the step 504, one or more sound class scores for a frame are received. The one or more sound class scores for a frame are received from the machine learning model (e.g. generated at step 207).

At step 506 a confidence is determined that the sound class score is representative of a degree of affiliation of the frame with the sound class. The confidence is an output of a learned model, where the input for the learned model is a value for a property associated with the frame. In an embodiment the learned model may be a look up table.

In an embodiment, the learned model is an energy profile function $\phi_{i,t}$. In an embodiment the energy profile function is a look up table. In an example embodiment, the energy profile function is formulated as an array of 128 values, representing the energy in dBs ranging between (−127) and (0). Hence for class i, the energy profile function$\phi_{i,t}$ is represented discretely as:
a. learned model [i][0] #the energy profile for class i, at energy 0 dB
b. learned model [i][1] #the energy profile for class i, at energy −1 dB
c. . . .
d. learned model [i][127] #the energy profile for class i, at energy −127 dB When these energy profiles are provided at the warping stage, the optimization to find $\alpha$, $\{\beta_i\}$ is similar to the above-described score warping method. Indeed, when the model is a look-up table, for example when energy profile function $\phi_{i,t}$ is a look-up table, parameters $\alpha$ and $\beta_i$ may be learned, for example, by minimizing a loss function, wherein the loss function may be, for example, cross-entropy across the new data. For example, if there exists well optimized energy thresholds for class i, the energy profile function, $\phi_{i,t}$, is set to be 0 when $e_t$<Energy Threshold i and it is set to 1 when $e_t$≥Energy Threshold i. Therefore, when the energy (i.e. the value) is above a threshold, a confidence is determined to be 1, and when the energy (i.e. the value) is below the threshold, a confidence is determined to be 0. Therefore the confidence can be seen as a representation of how accurate the sound class score is, according to the learned model. In other words, the confidence may be used to emphasize or de-emphasize the relative importance of the frame scores across sound classes according to the learned model.

In an embodiment, the learned model is a distribution having parameters. The parameters may be learned. In an embodiment, the learned model is an energy profile function that is a distribution. In this embodiment the learned model may have too many variables to learn such a function, but this is overcome by parametrizing the learned model. For example the learning model may be parametrised (i.e. in this embodiment the energy profile function may be parametrised) as $\phi_{i,t}$, where:

$$\phi_{i,t} = \frac{1}{1+e^{\gamma(e_t-\sigma)}}, \gamma > 0$$

where $e_t$ is the energy measured in dBs. In other words, $e_t$ is the value for the property, where the property is energy; $\gamma$ and $\sigma$ are parameters of the model, wherein parameters $\gamma$ and $\sigma$ may be learned by minimizing, for example, a loss function across the new data (e.g. the 'additional data'); wherein parameters $\gamma$ and $\sigma$ may be learned jointly with parameters $\alpha$ and $\beta_i$ by minimizing, for example, cross-entropy across the new data. Other learning algorithms to jointly learn $\alpha$, $\beta_i$, $\gamma$ and $\sigma$, given a functional expression for $\phi_{i,t}$, may include the EM algorithm, Baum-Welch algorithm, the minimization of a custom loss function other than cross-entropy, the minimization of a connectionist Temporal classification (CTC) loss. Other functional expressions for $\phi_{i,t}$ may have other parameters than $\gamma$ and $\sigma$. For example, if $\phi_{i,t}$ is a Gaussian function then it may require the learning of means $\mu$ and variances $\sigma$, jointly with parameters $\alpha$ and $\beta_i$.

Irrespective of the exact nature of the learned model (e.g. a look-up table or a function etc), a confidence is determined as an output of the learned model, where the value is the input.

The confidence can be used to adjust at least one sound class score.

In step 508, the at least one sound class score for the frame is adjusted based at least on the determined confidence. In an embodiment, the adjustment can "switch off" the detection of a class based on the value for the property (via the determined confidence). Such switching off corresponds to an adjustment that reduces the sound class score to zero (or to a very low score at least). In the above example, the detection of a class can be switched off if the energy of the frame is too low. Similarly, the adjustment can reduce the sensitivity if needed, this corresponds to an adjustment that lowers the sound class score (rather than reducing the score to zero). A function that performs adjustment in such a way is exemplified below:

$$\hat{z}_0 = \alpha z_0$$

$$\hat{z}_i = \alpha(\phi_{i,t}(e_t)z_t+(1-\phi_{i,t}(e_t))\min z_0,\ldots,z_{N_c})+\beta_i, \forall i \in [1,\ldots,Nc]$$

wherein $z_i$ represents a sound class score for sound class i as output by the machine learning model, $\hat{z}_i$ represents the adjusted sound class score for sound class i, where $\alpha$ and $\beta_i$ are parameters that are learned using the 'additional information', Nc represents the number of sound classes. The 'min' function represents a selection of the minimum score out of all of the sound class scores (i.e. the minimum out of the sound class score for class 0 all the way through to class Nc). The class 0 represents a non-target sound class representative of an absence of each of the one or more sound classes, and may be referred to as the world class. where the energy profile function (i.e. the learned model) for class i at time t is a function of the energy ($e_t$) at time t. In this embodiment, $0 \leq \phi_{i,t}(e_t) \leq 1$, and where parameters $\alpha$ and $\beta_i$ can be learned jointly with the parameters of $\phi_{i,t}$ using a learning algorithm, for example an algorithm which may minimise of a loss function.

For this adjustment, when $\phi_{i,t}=1$, the sound class score is unmodified, whereas when $\phi_{i,t}=0$, the sound class score is modified to have the same value as the minimum of all the sound class scores for all classes (i.e. the lowest sound class score out of all of the sound class scores for the frame).

As a result, after the non-linear operation (e.g. a Softmax operation), the final outputs will be turned-on (i.e. adjusted to be close to the original value) or turned-off (adjusted to be close to 0) respectively. Setting the $\phi_{i,t}$ to values between 0 and 1 serves as a "soft" way to reduce the sensitivity of the output when the decision is less certain. Hence under this modification, the energy modelling is simply deciding on the energy profile function, $\phi_{i,t}$, with respect to the energy values, $e_t$.

More generally, this embodiment shows that the confidence may be used to emphasize or de-emphasize the relative importance of the frame scores across sound classes according to the learned model, so that measurements of affiliation between a frame and a sound class, or related classification decisions, can be modified by the confidence delivered by the model in relation with the value of the property for that frame.

As shown at 512, determining a confidence and adjusting the sound class score is performed for one or more of the at least one sound classes. The steps 504 to 508 are performed for each frame of the sequence of frames. The adjusted sound class scores may be processed to recognise at least one of a sound class and an event. The adjusted sound class scores may be processed as described in steps 211 and 213 in FIG. 2 to recognise at a sound class score and/or event.

FIG. 6 shows graphical examples of learned models. FIG. 6 shows a graph 600. The graph displays a first learned model 602 and a second learned model 604. The x axis represents values for a property. In this example the property is an energy of a frame of audio data in dB. The y axis represents a determined confidence for class i. In this particular example, the determined confidence ranges from 0 to 1.

The first learned model 602 is a learned model configured to receive, as a value for a property, an energy of a frame of audio data as an input. The first learned model 602 is a learned model having a fixed threshold of −75 dB. The first learned model 602 is a step function.

The second learned model 604 is a learned model configured to receive, as a value for a property, an energy of a frame of audio data as an input. The second learned model 604 is a learned model in line with the above description, i.e.: the second learned model is parametrised as $\phi_{i,t}$, where:

$$\phi_{i,t} = \frac{1}{1+e^{\gamma(e_t-\sigma)}}, \gamma > 0$$

where $e_t$ is the energy measured in dBs. In other words, $e_t$ is the value for the property, where the property is energy; $\gamma$ and $\sigma$ are parameters of the model, wherein parameters $\gamma$ and $\sigma$ may be learned by minimizing, for example, a loss function across the new data (e.g. the 'additional data'); wherein parameters $\gamma$ and $\sigma$ may be learned jointly with parameters $\alpha$ and $\beta_i$ by minimizing, for example, cross-entropy across the new data. The second learned function has a $\gamma=0.5$ and $\sigma=-80$.

In embodiments, when the threshold is known in advance, the parameters $\alpha$, $\{\beta_i\}$ can be much better optimized by disregarding the data with outliers in energy behaviour. However when jointly optimizing the energy profile (e.g. $\gamma$ and $\sigma$) along with, $\{\beta_i\}$, this adaptation may not be as straightforward, and may, in embodiments, end up with sub-optimal warping (i.e. adjusting) results.

The invention claimed is:

1. A method for recognising at least one of a non-verbal sound event and a scene in an audio signal comprising a sequence of frames of audio data, the method comprising:
 for each frame of the sequence of frames of audio data:
  receiving at least one sound class score, wherein each sound class score is representative of a degree of affiliation of the frame with a sound class of a plurality of sound classes;
  obtaining a value for a property associated with the frame;
  for a sound class score of the at least one sound class score:
   determining a confidence that the sound class score is representative of a degree of affiliation of the frame with the sound class by processing the value for the property associated with the frame, wherein the value is processed using a learned model for the property;
   adjusting the sound class score for the frame based at least on the determined confidence; and
  processing the adjusted sound class scores for the sequence of frames of audio data to recognise the at least one of a non-verbal sound event and a scene.

2. The method of claim 1, wherein the learned model comprises a look up table comprising a confidence for each of a plurality of values for the property.

3. The method of claim 1, wherein the learned model comprises a distribution defined by learned parameters, wherein the distribution defines a confidence for a range of values for the property.

4. The method of claim 1, wherein before processing the value for the property associated with the frame using the learned model for the property, the method comprises learning the learned model using a machine learning method.

5. The method of claim 4, wherein the machine learning method comprises training the learned model using additional data captured by one or more devices configured to capture the sequence of frames of audio data.

6. The method of claim 4, wherein the machine learning method comprises training the learned model using data collected that is associated with the property.

7. The method of claim 1, wherein the learned model is configured to define a confidence based on more than one property.

8. The method of claim 1, wherein said determining said confidence that the sound class score is representative of a degree of affiliation of the frame with the sound class further comprises processing an additional value for the property, wherein the additional value is associated with an additional frame of the sequence, wherein the additional value is processed using the learned model for the property.

9. The method of claim 1, further comprising generating the value for the property associated with the frame by processing the frame of audio data.

10. The method of claim 1, further comprising generating the value for the property associated with the frame by processing more than one frame of audio data.

11. The method of claim 1, wherein the property is associated with one or more of: the audio data for the frame; and an environment in which the frame of audio data was captured; a location at which the frame of audio data was captured; a feature of a device used to capture the frame of audio data; an audio feature of an environment in which the frame of audio data was captured.

12. The method of claim 1, further comprising performing a non-linear operation on each of the adjusted sound class scores.

13. The method of claim 12 wherein the non-linear operation is one of: a sigmoid operation; a softmax operation; a step function; a hyperbolic tangent function; a piecewise linear function; a rectified linear function; a polynomial; a radial basis function; and a neural network activation function.

14. The method of claim 1, further comprising training a machine learning model to generate the plurality of sound class scores, wherein the training comprises processing training data.

15. The method of claim 14, wherein the value of the property comprises additional information to the training data.

16. The method of claim 1, wherein adjusting the sound class score for the frame based at least on the determined confidence comprises:
reweighting, using the determined confidence, the sound class score and at least one other sound class score to generate multiple reweighted sound class scores;
combining the multiple reweighted sound class scores to generate a combined adjusted sound class score; and
adjusting the sound class score using the combined adjusted sound class score.

17. The method of claim 1, further comprising processing the adjusted sound class scores for the sequence of frames to determine a degree of affiliation of the frame with the at least one of a non-verbal sound event and a scene.

18. A non-transitory data carrier carrying processor control code which when running on a device causes the device to perform the method of claim 1.

19. A system for recognising at least one of a non-verbal sound event and a scene in an audio signal comprising a sequence of frames of audio data, the system comprising a microphone to capture the audio data and one or more processors, wherein the one or more processors are configured to:
for each frame of the sequence of frames of audio data:
receive at least one sound class score, wherein each sound class score is representative of a degree of affiliation of the frame with a sound class of a plurality of sound classes; and
obtain a value for a property associated with the frame;
for a sound class score of the at least one sound class scores:
determine a confidence that the sound class score is representative of a degree of affiliation of the frame with the sound class by processing the value for the property associated with the frame, wherein the value is processed using a learned model for the property; and
adjust the sound class score for the frame based at least on the determined confidence,
wherein the one or more processors are further configured to process the adjusted sound class scores for the sequence of frames of audio data to recognise the at least one of a non-verbal sound event and a scene.

* * * * *